UNITED STATES PATENT OFFICE.

GEORGE HILLARD BENJAMIN, OF NEW YORK, N. Y.

PROCESS OF MAKING SOLUBLE COFFEE.

1,158,431.   Specification of Letters Patent.   Patented Nov. 2, 1915.

No Drawing.   Application filed September 23, 1914.   Serial No. 863,102.

*To all whom it may concern:*

Be it known that I, GEORGE HILLARD BENJAMIN, a citizen of the United States, residing at New York city, in the county and State of New York, have invented a certain new and Improved Process of Making Soluble Coffee, of which the following is a specification.

The object of my invention is to produce as an article of manufacture, a dry body which shall contain all or substantially all of those aromatic and other bodies originally contained in the coffee treated, and which makes it desirous as a beverage, and further, to standardize the product obtained so that a definite quantity of the product will contain a fixed amount of the aromatic oils and other bodies.

To carry my invention into effect, I proceed in the following manner: Raw coffee beans are distributed over the surface of a shallow dish or pan, and covered with water having a temperature of approximately 60° Fahrenheit. The effect of the water and the temperature is to cause the beans to soften and partially germinate. The time required to effect partial germination will depend upon the ripeness and age of the beans—generally from twelve to twenty-four hours is sufficient to cause the beans to double in size and send out a spout or acrospire, or as otherwise stated, to develop the presence of maltose. It sometimes will be necessary to change the water a number of times, depending, as before stated, upon the condition of the beans.

The object of the above treatment is fourfold: (a) to soften and distend the beans, and thereby put them in the best condition for the subsequent removal of the contained bodies; (b) to convert all or a portion of the cellulose present into maltose; (c) to break up the chemical bonds existing between the caffein, caffetannic acid and caffeic acid; (d) to set free the oily matters, and thereby permit the extraction of oxidized oils or the emulsifying of excess oils.

After the acrospire has reached the required size and the presence of maltose is assured, the beans are drained of the water in which they were immersed, and partially dried in a centrifugal machine. The partially dried beans are then placed upon perforated trays or upon moving aprons, and inserted into or passed through a dehydrating apparatus of any well known type, and therein subjected first to the action of sufficient heat to thoroughly heat the beans, and second to the action of currents of dehydrated warm air to thoroughly dry the beans. The object of first heating the beans is two-fold: (a) to completely arrest germination; and (b) by heating the fluid contained within the cells of the beans to cause exudation of the fluid within the cells. The temperature to which the beans should be subjected should be sufficiently high (*i. e.*, approximately 160° Fahrenheit) to thoroughly heat them, but not sufficiently high to cause coagulation of any albumen present, or volatilization of the aromatic oils. The object of subjecting the beans to the action of warm dehydrated air is to remove the external and internal moisture, and to bring the beans to a thoroughly dried condition.

In practice it has been demonstrated that where the beans or other bodies treated, are primarily heated to the required temperature necessary to effect exudation from within the cells of the body, the cell walls are distended and thereby made thinner, which facilitates the extraction of the contained fluids when such bodies are subsequently subjected to the action of moving warm dehydrated air currents. It has further been demonstrated that it is preferable, when heating the beans, to do so under conditions and by a medium which has no absorptive value for water or the contained fluids. The heating may be conveniently effected by subjecting the beans to a body of heated air, practically saturated with moisture, the object being, as before stated, to heat the beans, cause exudation of the fluid within the cells, but avoid removal of the fluid exuded from within the cells or present on the outside of the beans.

After the beans have been thoroughly dried, they are then roasted and ground. After grinding, the ground beans are inserted in a percolating apparatus, preferably of the vacuum type, and therein subjected to the action of water heated to between 160° and 180° Fahrenheit. I prefer the lower temperature, although with certain grades of beans (generally old beans containing large amounts of volatile oils) the high temperature may be employed. The percolating water will extract from the ground beans practically all of the bodies which are soluble in, or which may be picked up by the water. Instead of using water alone as the percolating medium, I may first use hot alcohol or hot ether, and extract all the bodies which may be picked up by such fluids and then follow with hot water, as first stated. In practice it has been found that with coffee in good condition (that is, not too old) percolation by hot water will be sufficient, but where the coffee is old and hard and the oils approaching a gummy or resinous condition, it will be necessary to first use alcohol or ether and subsequently water.

After percolation has been accomplished, the derived fluid may, if desired, be treated for the removal of caffein, as described in U. S. Letters Patent No. 947577 granted to Robert Hubner, January 25, 1910. Further, the derived fluid as it comes from the percolator may be treated for the removal of rancid bodies, fatty bodies, excess oils, and the like. The rancid bodies may be washed out of the oils; the fatty bodies or excess oils may be emulsified by the addition of magnesium or sodium carbonate.

It is well understood that the coffee bean, considered by itself, is merely a woody fiber, and that the amount of oils, caffein, and other bodies is dependent largely upon the locality in which the coffee is grown, the treatment of the coffee after harvesting and before and after shipment.

Assuming now that it is desired to produce a soluble coffee which shall contain a definite amount of caffein, caffe-tannic acid, caffeic acid, essential oils, ketones, glycerids, etc., the extracts may be made in the manner above described, from various grades of coffee, and the extracts then mixed. For instance, an extract from a coffee deficient in oils may be mixed with an extract from a coffee having excess of oils, etc. It has been proved possible, by mixing extracts, to produce a soluble dry extract having any required degree of strength or flavor. After percolating, the dry body is introduced into a vacuum apparatus at a low temperature, to remove as much water as is possible. The temperature should not be sufficient to volatilize any of the oils, or to convert any of the bodies present into sugar. The residuum is then removed from the vacuum pans and placed upon trays in a dehydrating apparatus and therein subjected to currents of warm dehydrated air having a temperature of approximately 160°. The dried body from the dehydrator may then be mixed with a carrying body, as for instance, sugar of milk, or chicory may be added in a pulverized state, as well as other bodies intended to add flavor or give it particular flavor. The dried product derived from the process stated has its essential characteristic in that it is not hygroscopic, as is the case with all other soluble coffees which have been offered for use. This condition is probably due to the fact that all of the moisture has been removed by the dehydration treatment, and further, the gums and oils which are present are in a condition not to combine with the oxygen of the air except under conditions of high temperature and humidity. Where the product is to be used in very hot countries, it should be packed in hermetically sealed cans.

I wish to have it understood that it is also within the contemplation of my invention to introduce the standardized extract, before concentration, into whole coffee beans from which the extract has been made. The coffee beans, as before stated, are a woody fiber and absorptive, and will take up a large amount of extract; or, in other words, the coffee beans will be restored to approximately their normal condition, so far as serving as a carrying medium for the various aromatic oils, caffein, caffetannic acid, etc., is concerned. I however make no claim for the particular process of reincorporation above generally described.

Having thus described my invention, I claim:

1. A step in the process of making a soluble dry extract, which consists in subjecting wet coffee containing maltose to the action of sufficient temperature to heat it to between 150° and 160° Fahrenheit before extracting the contained water.

2. The process of making soluble coffee, which consists in first setting up limited germination of the coffee beans, then subjecting the beans to the action of heat to set up exudation within the cell walls of the beans, then extracting the soluble bodies carried by the beans, then concentrating said soluble bodies, and then subjecting said concentrated bodies to the action of the dehydrated air to produce a dry product.

3. The process of making soluble coffee, which consists in first subjecting the coffee beans to the action of warm water for a sufficient length of time to effect partial germination and the production of maltose, then to the action of heat to raise the coffee beans to between 150° and 160° Fahrenheit, then to the action of dehydrated air to remove any external water and liquid which may be exosmosed from the cells of the coffee, then removing the soluble matters by the action of percolated water, then concentrating, and then drying the concentrate by the action of dehydrated air.

4. The process of making soluble coffee, which consists in first subjecting coffee beans to the action of warm water for a sufficient length of time to effect partial germination and the production of maltose, then to the action of heat to raise the coffee beans to between 150° and 160° Fahrenheit, then to the action of dehydrated air to remove any external water and liquid which may be exosmosed from the cells of the coffee, then removing the soluble matters by the action of percolated water, then concentrating, and then drying the concentrate by the action of dehydrated air.

5. The process of making soluble coffee, which consists in first subjecting raw coffee beans to the action of warm water for a sufficient length of time to effect partial germination and the production of maltose, then to the action of heat to effect exosmotic exudation of the water from within the cells of the beans, then drying by the action of dehydrated air, then roasting, then grinding, then removing the soluble matters by a solvent fluid, then concentrating, and then drying by dehydrated air.

6. The process of making a standardized soluble coffee, which consists in subjecting raw coffee beans of different origin separately to the action of warm water for a sufficient time to effect partial germination and the production of maltose, then to the action of heat to effect exosmotic exudation of the water from within the cells of the beans, then drying, then roasting, then grinding, then removing the soluble matters from each body of coffee by solvent fluids, then mixing the removed soluble matters in required proportions to produce a standardized extract, then concentrating such extract, and finally drying the concentrate by dehydrated air.

In testimony whereof, I affix my signature, in the presence of two witnesses.

GEORGE HILLARD BENJAMIN.

Witnesses:
HELEN E. KOELSCH,
LESTER BEARDSLEY.